United States Patent
Yu (10) Patent No.: US 12,332,374 B2
(45) Date of Patent: Jun. 17, 2025

(54) DISTRIBUTION FITTING CONSTANT FALSE ALARM RATE (CFAR) DETECTION

(71) Applicant: Aptiv Technologies AG, Schaffhausen (CH)

(72) Inventor: Xining Yu, Carmel, IN (US)

(73) Assignee: Aptiv Technologies AG, Schaffhausen (CH)

( * ) Notice: Subject to any disclaimer, the term of this patent is extended or adjusted under 35 U.S.C. 154(b) by 331 days.

(21) Appl. No.: 17/664,943

(22) Filed: May 25, 2022

(65) Prior Publication Data

US 2023/0333207 A1 Oct. 19, 2023

Related U.S. Application Data

(60) Provisional application No. 63/363,230, filed on Apr. 19, 2022.

(51) Int. Cl.
*G01S 7/292* (2006.01)
*G01S 7/41* (2006.01)

(52) U.S. Cl.
CPC .......... *G01S 7/2927* (2013.01); *G01S 7/2922* (2013.01); *G01S 7/414* (2013.01)

(58) Field of Classification Search
CPC ....... G01S 7/414; G01S 7/2927; G01S 7/2922
See application file for complete search history.

(56) References Cited

U.S. PATENT DOCUMENTS

2024/0103156 A1* 3/2024 Bowers ............... G01S 13/9021

FOREIGN PATENT DOCUMENTS

CN 108919247 A 11/2018
EP 0588688 B1 * 11/1996

OTHER PUBLICATIONS

EP-0588688-B1 translation (Year: 1996).*
Blake, "OS-CFAR Theory for Multiple Targets and Nonuniform Clutter", IEEE Transactions on Aerospace and Electronic Systems, vol. 24, No. 6, Nov. 1988, pp. 785-790.
"Extended European Search Report", EP Application No. 23159571.1, Jul. 5, 2023, 10 pages.

(Continued)

*Primary Examiner* — Matthew M Barker
(74) *Attorney, Agent, or Firm* — Harness, Dickey & Pierce, P.L.C.

(57) ABSTRACT

Distribution fitting Constant False Alarm Rate (CFAR) detection is described. Noise data in cells or bins around a target cell are fit to a noise distribution model, such as a Rayleigh distribution model. With a suitable noise distribution curve from the distribution model, a CFAR threshold for that cell along the curve can be determined. A quantile function of the noise distribution model for a bin or cell provides the CFAR threshold to use for that bin or cell. Distribution fitting CFAR enables a more-accurate CFAR threshold to be set for each bin or cell and may use far fewer computing resources than Ordered-Statistics CFAR. A radar detector can better prevent false alarm detections across multiple different driving scenarios by adapting to different environments and dynamically changing the noise distribution curve used depending on best-fit analysis by a noise distribution model of noise characteristics of the neighboring bins or cells.

20 Claims, 6 Drawing Sheets

(56) References Cited

OTHER PUBLICATIONS

Anitori, et al., "Design and Analysis of Compressed Sensing Radar Detectors", IEEE Transactions on Signal Processing, vol. 61, No. 4, Feb. 15, 2013, pp. 813-827.
Luhr, et al., "Radar Noise Reduction Based on Binary Integration", IEEE Sensors Journal, vol. 15, No. 2, Feb. 1, 2015, pp. 766-777.
Rosenberg, et al., "Target Detection in Medium Grazing Angle Sea Clutter Using Scan to Scan Processing", 2019 International Radar Conference (Radar), Sep. 23, 2019, 5 pages.
Tao, et al., "A Segmentation-Based CFAR Detection Algorithm Using Truncated Statistics", IEEE Transactions on Geoscience and Remote Sensing, vol. 54, No. 5, May 1, 2016, pp. 2887-2898.
European Office Action for EP Application No. 23159571.1, Sep. 3, 2024.
European Office Action issued in EP Application No. 23159571.1, Apr. 30, 2025, 5 pages.

\* cited by examiner

DISTRIBUTION FITTING CONSTANT FALSE ALARM RATE (CFAR) DETECTION

CROSS-REFERENCE TO RELATED APPLICATION

This application claims the benefit of U.S. Provisional Patent Application No. 63/363,230, filed Apr. 19, 2022, which is incorporated by reference herein in its entirety.

BACKGROUND

A perception system for a vehicle (e.g., advanced safety or automated driving system) may rely on a radar system to detect objects that are present in a driving scene (e.g., on a roadway). There can be interference caused by other vehicle systems or unknown sources in the environment; if untreated, this noise can manifest as false detections reported by the radar system for targets that do not actually exist or actual detections of targets that go undetected by the radar system. There are multiple ways to lower a radar false alarm rate. One way includes executing Constant False Alarm Rate (CFAR) processing techniques in which a power threshold being applied to radar detections adjusts to be above estimated noise levels for an operating environment. CFAR allows returns that probably originate from actual targets to be reported and returns from other sources in the environment to be suppressed. In an ideal case, noise appears at known inference levels, however, in reality, environmental noise can manifest as highly attenable and unpredictable signals that are non-uniform in time and space, which makes tuning the CFAR power threshold for changing driving scenarios to be a challenge.

SUMMARY

This document describes techniques and systems for distribution fitting CFAR detection. This Summary is not intended to identify essential features of the claimed subject matter, nor is it intended for use in determining the scope of the claimed subject matter.

In one example, a system includes a processor configured to obtain multiple samples of radar returns including noise reflecting from an environment outside a vehicle. The processor is further configured to maintain an array (e.g., a data cube) of the samples including each of the samples in a different, corresponding cell of the array, and for each of the samples, determine a respective constant false alarm rate (CFAR) threshold for filtering the noise from the corresponding cell of the array. The processor is configured to determine the CFAR threshold by: determining a group of neighbor cells to the corresponding cell to use as training cells, generating a histogram that organizes the samples of the training cells into columns representing successive ranges of amplitude for the samples of the training cells, fitting the histogram to a noise distribution function, and determining the respective CFAR threshold for the corresponding cell from the noise distribution function that is fitted to the histogram for that corresponding cell. The processor is further configured to filter the samples from the array that do not satisfy the respective CFAR threshold for the corresponding cell, and in some examples, responsive to filtering the samples from the array, output the array for use by a vehicle function in detecting objects that appear in the environment.

In addition to this and other examples, methods are described for performing distribution fitting CFAR detection. In some cases, a computer-readable media (CRM) includes instructions that when executed by a processor, configure the processor to perform these methods. Systems are also contemplated by this disclosure including means for performing these methods. Through implementation of these and other examples contemplated by this disclosure, distribution fitting CFAR detection can be achieved to discern actual targets from noise in a radar signal more accurately than from using other CFAR detection techniques.

BRIEF DESCRIPTION OF THE DRAWINGS

The details for distribution fitting CFAR detection are described in this document with reference to the Drawings that may use same numbers to reference like features and components, and hyphenated numbers to designate variations of these like features and components. The Drawings are organized as follows.

DETAILED DESCRIPTION

Overview

A vehicle may include a multiple-Input-Multiple-Output (MIMO) radar system to generate a three-dimensional data cube of radar results derived from processing multiple samples of individual radar chirps, which are transmitted on multiple channels. For each look period, a new data cube can be stored in memory as a one-dimensional array; each cell is individually addressable using a unique combination of parameters that are indicative of range bin, chirp identity, and channel. Range processing phase fills the data cube with range Fast Fourier Transform (FFT) results for successive chirps by addressing rows of the cells. By addressing columns of the cells, Doppler processing retrieves the range FFT results for successive ranges.

In radar systems, a valid detection in a cell or bin of a data cube may be surrounded by ambient noise. The ambient noise in an environment is constantly changing. False alarms or false detections can be reported when the ambient noise (e.g., its power) is at levels that mask valid detections. To improve the accuracy of target detections and functionality of vehicle systems that rely on radar data, a radar is set to operate with a low false alarm rate. A threshold can be used to separate the noise from the valid detection. A set of techniques may be used to adaptively set the threshold to maintain a Constant False Alarm Rate (CFAR) for various scenarios. CFAR processing techniques can be applied before or after either range processing or Doppler processing occurs. Due to their simplicity and robustness, two of the most common CFAR processing techniques include Cell-Averaging CFAR and Ordered Statistic CFAR. In both Cell-Averaging CFAR and Ordered-Statistic CFAR, a radar system checks for the presence of actual targets based on noise power estimates taken from neighboring (e.g., leading and lagging) cells or range-bins.

Cell-Averaging CFAR sets a detection threshold to an average (e.g., mean) of power estimates (or a factor thereof) of neighboring cells. If a cell exceeds an average power detection threshold, then that cell records a target detection. Cell-Averaging CFAR can have accurate and stable performance when two conditions are met. A first condition is that each true target is isolated from the other true targets (e.g., each target is a standalone target) otherwise Cell-Averaging CFAR provides inaccurate results. Two targets are not standalone if they are continuously aligned with each other either in range or Doppler domains. Second, the neighbor cells sampled to estimate the noise power are assumed to be independently and identically distributed. When neighbor samples are influenced by noise, this influence can inaccurately bias the averaging calculation.

Ordered-Statistic CFAR improves on Cell-Averaging CFAR to address common, multiple target scenarios. Ordered-Statistics CFAR also analyzes the noise power from neighboring bins. However, rather than consider a mean of the noise power, an amplitude of power at each neighboring cell or bin is ranked in order. The cell with the highest power is chosen and a noise threshold set accordingly. Unlike Cell-Averaging CFAR, Ordered-Statistic CFAR is not conditioned on a homogeneous clutter for each standalone target; however, an excessive false alarm rate can arise at the edges of the clutters. Adjusting which cells to includes among neighbors can have varying degrees on performance. Choosing a quantity of neighboring cells to rank may depend greatly on driving conditions and sources of noise in an environment. Environments are constantly changing in vehicle applications; it may be challenging to adapt the neighbor sample size for Ordered-Statistics CFAR to accommodate fluctuating conditions. Compared with cell-averaging, improved accuracy of Ordered-Statistics CFAR may be outweighed by its increase in processing complexity (e.g., a sorting function), which requires faster and typically more expensive computing resources, which limits use of Ordered-Statistics CFAR to more costly radar applications.

A main drawback of widely used CFAR techniques is that they cannot adapt to estimate noise thresholds for different measurement environments. For example, in automotive radar applications, a host vehicle may drive in an open street at one time, and then quickly switch to driving on a highway with a guardrail on one or both sides. A noise or clutter model used to estimate the noise in these two different scenarios should behave differently to address the presence or absence of the guard rail. However, neither Ordered-Statistics or Cell-Averaging CFAR can provide a noise model that obtains a correct result for both situations; instead, one is handled better than the other.

In contrast to existing CFAR techniques, this document describes distribution fitting CFAR techniques for radar detections. Noise data in cells or bins around a target cell are fit to a noise distribution model, such as a Rayleigh distribution model. With a suitable noise distribution curve obtained from the distribution model, a CFAR threshold for that cell along the curve can be determined. A quantile function of the noise distribution model for a bin or cell provides the CFAR threshold to use for that bin or cell. Distribution fitting CFAR enables a more-accurate CFAR threshold to be set for each bin or cell and may use far fewer computing resources than Ordered-Statistics CFAR. A radar detector can better prevent false alarm detections across multiple different driving scenarios by adapting to different environments and dynamically changing the noise distribution curve used depending on best-fit analysis by a noise distribution model of noise characteristics of the neighboring bins or cells.

Example Environment

Figure 1:
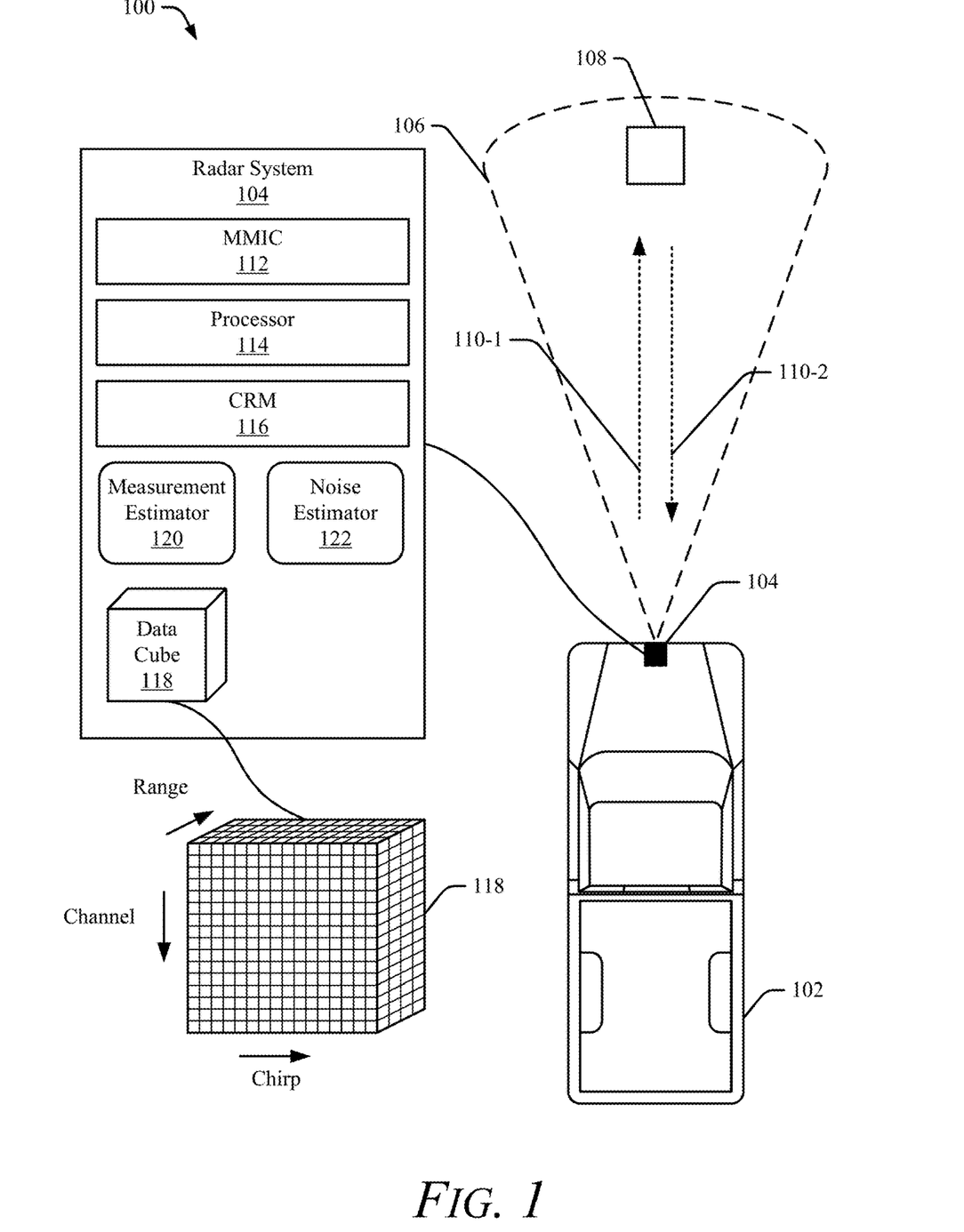
FIG. 1 illustrates a conceptual diagram of an example environment for performing distribution fitting CFAR detection, in accordance with the described techniques.

FIG. 1 illustrates a conceptual diagram of an example environment 100 for performing distribution fitting CFAR detection, in accordance with the described techniques. The environment 100 includes a vehicle 102 including a radar system 104. The radar system 104 enables other systems of the vehicle 102 (not shown for simplicity in the drawings) to detect an object 108, which can impact how or whether the vehicle 102 can continue to travel.

The depicted environment 100 includes the vehicle 102 traveling on a roadway. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The radar system 104 has a region of interest associated with the radar system 104, which at least partially surrounds the vehicle 102. This region of interest is referred to as a field of view 106 (also referred to as an instrumented field of view). The radar system 104 can transmit radar signals 110-1 into the field of view 106 and process radar returns 110-2 that reflect back from the environment 100 to determine the position, angle, range-rate, or other characteristics of the object 108 relative a position and orientation of the vehicle 102. Careful selection and/or positioning of components of the radar system 104 may cause the field of view 106 to have a particular shape or size. Components of the radar system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location of the vehicle 102.

As previously suggested, the vehicle 102 includes other vehicle systems that are operatively and/or communicatively coupled to the radar system 104 using wired and/or wireless links that act as interconnections, paths, or busses for vehicle inter-component communications. These other vehicle systems use outputs from the radar system 104 to perform vehicle-based functions, which in addition to other functions may include functions for vehicle control. Any conceivable device, apparatus, assembly, module, component, subsystem, routine, circuit, processor, controller, or the like, can be configured as a vehicle system that uses radar data to act on behalf of the vehicle 102. As some non-limiting examples, the other vehicle systems may include a system for autonomous control, a system for safety, a system for localization, a system for vehicle-to-vehicle communication, a system for use as an occupant interface, and a system for use as a radar or multi-sensor tracker.

The radar system 104 includes a monolithic microwave integrated circuit (MMIC) 112, a processor 114, and a computer-readable media (CRM) 116. Through the MMIC 112, the processor 114 is operatively coupled to an interface of a multiple-input-multiple-output (MIMO) array (not shown). The MMIC 112, the processor 114, and/or the CRM 116 may be operatively and/or communicatively coupled via wired or wireless links (not shown), and may be part of a radar chip, which may be referred to as a system on chip. Other devices, antennas, and other radar components may be used by the radar system 104. The radar system 104 includes an antenna array, such as a multiple-input-multiple-output (MIMO) array capable of transmitting multiple chirps across a range of frequencies, on multiple channels.

The MMIC 112 accumulates radar data from the MIMO array on behalf of the processor 114. The radar data includes information about the position and movement of objects in the field of view 106, such as positions and range-rates of radar detections that reflect off the object 108. The MMIC 112 receives instructions from the processor 114 to indicate characteristics (e.g., timing, phase, frequency range, channels) of the radar signals 110-1 and their corresponding reflections, i.e., the radar returns 110-2. The MMIC 112 causes the radar signals 110-1 to be transmitted via the MIMO array and into the environment 100 and then, causes the radar returns 110-2 to be detected and received.

The processor 114 processes the radar data generated by the MMIC 112, and outputs the processed radar data into a data structure (e.g., one-dimensional array; multiple-dimension array) usable by the other vehicle systems of the vehicle 102. A data cube 118 is an example of processed radar data generated by the processor 114 from radar data obtained by the MMIC 112. The data cube 118 is generated from performing distribution fitting CFAR detection, in accordance with the techniques of this disclosure. Any single or multiple dimension data structure can be used; the data cube 118 is only one example of a suitable format for conveying information about the radar returns 110-2, for enabling distribution fitting CFAR detection. The processor 114 may include a hardware accelerator, a controller, a control circuit, a microprocessor, its own chip, its own system, its own system-on-chip, a device, a processing unit, a digital signal processing unit, a graphics processing unit, or a central processing unit. The processor 114 may include multiple processors or cores, embedded memory storing executable software or firmware, internal/dedicated/secure cache or any other computer element that enables the processor 114 to execute machine-readable instructions for generating radar outputs.

In some examples, at least the CRM 116 and the processor 114 are a single component, such as an embedded system or system on chip. At least a portion of the CRM 116 is configured as a dedicated storage for the processor 114. The CRM 116 may include portions of storage (e.g., memory) reserved by the processor 114 to maintain the data cube 118 before or after performing distribution fitting CFAR. Access to the CRM 116 may be shared by other components of the radar system 104. The CRM 116 may also store machine-readable instructions for executing radar operations. As two examples, the CRM 116 stores instructions for executing radar functions performed by a measurement estimator 120 and a noise estimator 122.

The measurement estimator 120 is configured to estimate and store values for detections, including range, Doppler, and/or angle. It should be understood that distribution fitting CFAR techniques can be applied to the radar system 104 regardless of whether the measurement estimator 120 can estimate just one of range, Doppler, and angle, whether the measurement estimator can determine two of range, Doppler, and angle, or whether all three of range, Doppler, and angle can be estimated. With these measurements, the data cube 118 and information derived therefrom (e.g., radar tracks to objects) can be used to enable advanced safety or autonomous driving functions that avoid obstacles at positions and velocities inferred from the data cube 118. Information, including the data cube 118, can be communicated within the radar system 104 to enable other functions of other radar system (e.g., object classifying, object tracking), which for simplicity of the drawings are not shown in FIG. 1. It is also possible that other systems of the vehicle 102 and/or other vehicles and external systems receive information from the radar system 104 (e.g., using vehicle to everything communication networks), including the data cube 118, to enable safe driving by these other vehicles, as well.

The noise estimator 122 is configured to filter noise from the data cube 118 to improve its accuracy and eliminate false alarm detections. The noise estimator 122 can execute on behalf of the measurement estimator 120, or as a pre-processing or post-processing step. Noise associated with the data cube 118 can be filtered from the data cube 118 at different times in the processing pipeline of the radar system 104. The noise estimator 122 can precede or follow execution of the measurement estimator 122. The noise estimator 122 can estimate noise at different stages of the measurement estimator 122; this includes determining the noise either before, after, or while the measurement estimator 122 performs range processing, Doppler processing, and/or angle estimating. Although, executing the noise estimator 122 earlier may improve throughput of the radar system 104 because the measurement estimator 122 can avoid wasting processing resources (e.g., cycle time of the processor 114, storage capacity of the CRM 116) estimating range, Doppler, or angle for detections that are likely attributed to noise.

Example Noise Estimator

Figure 2:
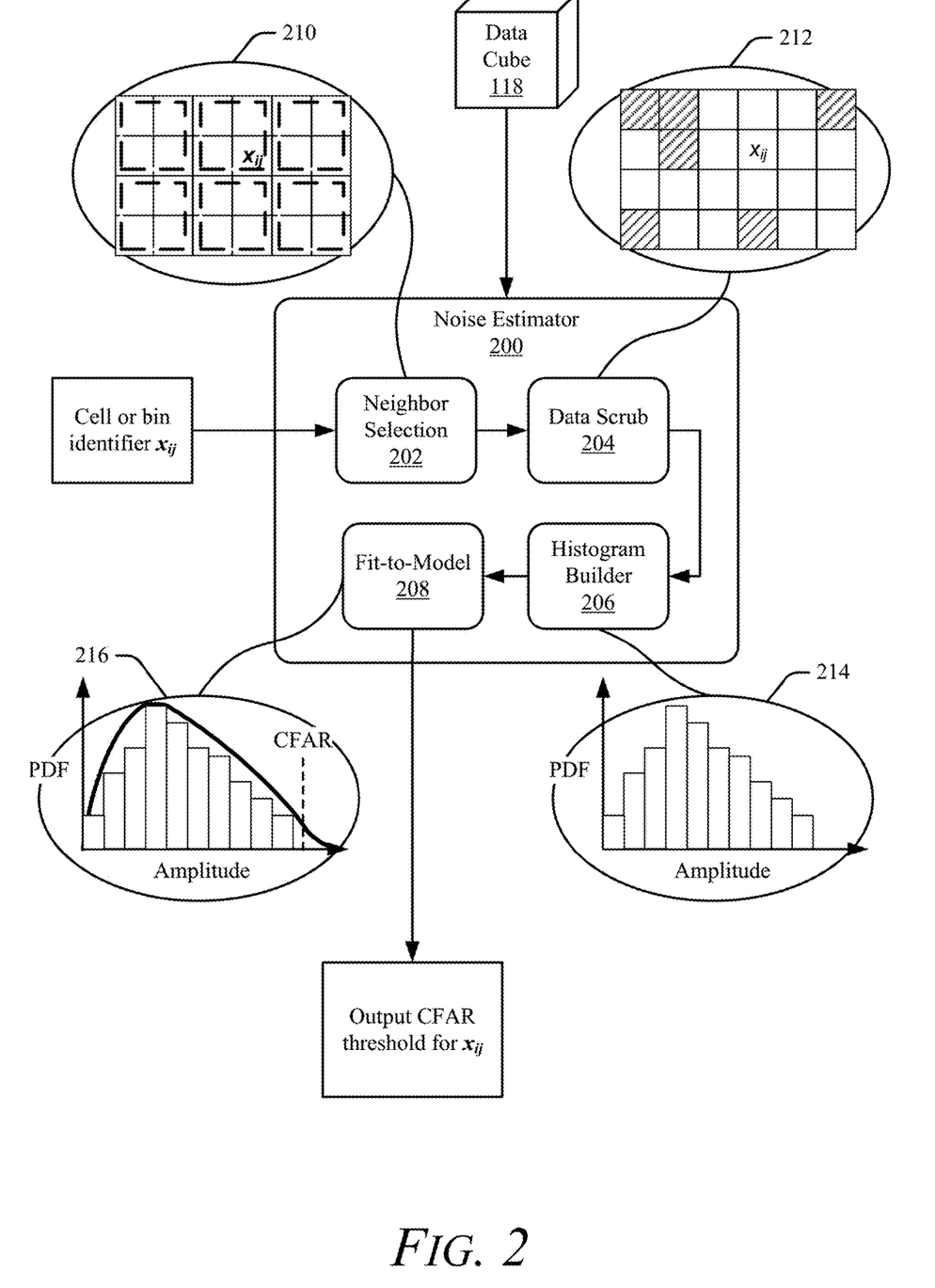
FIG. 2 illustrates a conceptual diagram of an example noise estimator for a radar system configured to perform distribution fitting CFAR detection, in accordance with the described techniques.

FIG. 2 illustrates a conceptual diagram of an example noise estimator 200 for a radar system configured to perform distribution fitting CFAR detection, in accordance with the described techniques. The noise estimator 200 is an example of the noise estimator 122 and is described in the context of the environment 100 as part of the radar system 104 of the vehicle 102.

The noise estimator 200 is configured to apply distribution fitting CFAR to each cell or bin of the data cube 118. The data cube 118 (or memory location of the data cube 118) is received as input to the noise estimator 200. A CFAR threshold for each cell is output for use in filtering noise from the data cube 118. Cells of the data cube 118 that satisfy their respective CFAR thresholds may be processed by the measurement estimator 120, and cells of the data cube 118 that do not can be ignored. In the example shown in FIG. 2, the noise estimator 200 divides the distribution fitting CFAR check into four stages: calculating noise power, scrubbing potential targets, fitting noise data into distribution models, and determining the CFAR thresholds.

A neighbor selection component 202 executes the first stage by determining a current cell under test, denoted as $x_{ij}$, along with its neighboring cells or bins, referred to as training cells 210. In this example, the training cells 210 are drawn as a two-dimensional matrix, however, the training cells can be organized in a single dimensional array. Training cells are chosen by the neighbor selection component 202 to contain noise data with similar statistics as the cell under test $x_{ij}$.

A data scrub component 204 performs the next stage of the distribution fitting CFAR check. A scrub threshold is computed to remove a first group of the training cells 210 with easily recognizable noise. For example, the training cells 210 are subdivided into (e.g., six) equal subgroups containing four different training cells in each. A mean of each subgroup is calculated, and a rough noise power, $\sigma_r$, can be set equal to the smallest mean of all the subgroups.

Then, the scrub-threshold for the cell under test $x_{ij}$ may be determined by solving for S using Equation 1:

$$S = \beta \sigma_r \quad \text{Equation 1.}$$

In the Equation 1, $\beta$ is a scaling factor that can be chosen by the data scrub component 204 based on experience (e.g., it can change over time to be tuned for a particular application). During the scrubbing phase of the distributed fitting CFAR check, the training cells 210 with amplitude (e.g., power) that is lower than S are saved for further processing, whereas the training cells 210 that do not are immediately treated as noise bins, $N_{bin}$ and may be discarded. Training cells 212 are shown including white cells that are saved and shaded cells that are ignored or discarded.

A histogram builder component 206 generates a histogram graph 214 of the training cells 212 that remain after scrubbing. The training cells 212 are grouped into columns $N_{bin}$ of similar amplitude that increases along the x-axis. The y-axis of the histogram graph 214 is an estimated Probability Density Function (PDF) for that group. In some cases, there may be training cells 212 with amplitude lower than S that are saved in the columns $N_{bin}$. However, because their quantity is limited, their existence in the columns $N_{bin}$ may not highly influence the result of the CFAR threshold calculation.

At the fourth stage, the noise estimator relies on a fit-to-model component 208 where the histogram graph 214 is fitted to a noise model 216. For example, a Rayleigh distribution may be observed when the amplitude of noise is calculated from a complex measurement, which is an uncorrelated, normal distribution with equal variance, and zero mean.

As a practical example, to determine the CFAR threshold efficiently, a mean of a Rayleigh random variable can be determined from Equation 2:

$$\mu(N_{bin}) = \sigma \sqrt{\frac{\pi}{2}}. \quad \text{Equation 2}$$

Once the mean of each column $N_{bin}$ is calculated, a mean Rayleigh distribution scale parameter $\sigma_\mu$ can be determined from Equation 3:

$$\sigma_\mu = \mu(N_{bin}) \sqrt{\frac{2}{\pi}} \approx 0.7979 \cdot \mu(N_{bin}). \quad \text{Equation 3}$$

An offset A may be used to account for non-zero mean noise, as given by Equation 4.

$$A = \sigma_\mu - \sigma \sqrt{\frac{\pi}{2}}. \quad \text{Equation 4}$$

This offset A is applied to noise samples to account for known sources of noise, such as, DC bias or phase noise, which enables real-world measurements to be taken by accounting for any shift of the PDF of the Rayleigh distribution.

Another way to account for this shifting is to use a peak of a Rayleigh distribution scale parameter $\sigma_{pk}$ can be calculated from determining a peak of the histogram graph 214, which is a maximum PDF of a Rayleigh distribution $f_{max}$, as provided by Equation 5:

$$f_{max} = \frac{1}{\sigma} e^{-0.5}. \quad \text{Equation 5}$$

In the Equation 5, $f_{max}$ is the peak of the histogram graph 214. Then, a second scale parameter, a peak Rayleigh distribution scale parameter $\sigma_{pk}$, can be calculated from Equation 6:

$$\sigma_{pk} = \frac{e^{-0.5}}{f_{max}} \approx \frac{0.6065}{f_{max}}. \quad \text{Equation 6}$$

The differences between the mean Rayleigh distribution scale parameter $\sigma_\mu$ and the peak Rayleigh distribution scale parameter $\sigma_{pk}$ is given by Equation 7:

$$\delta = \sigma_\mu - \sigma_{pk} \sqrt{\frac{\pi}{2}}. \quad \text{Equation 7}$$

This difference can be used to represent an unknown bias level that is applied to the noise samples. The $p^{th}$ quantile function is defined by Equation 8, where p is the false alarm rate:

$$Q(p;\sigma) = \sigma \sqrt{-2\ln(1-p)} \quad \text{Equation 8.}$$

Finally, the fit-to-model component 208 can generate the CFAR threshold $T_{ij}$ for the current cell under test $x_{ij}$ using Equation 9:

$$T_{ij} = \alpha \cdot [\delta + Q(p;\sigma)] = \alpha \cdot [\delta + \sigma_{pk}\sqrt{-2\ln(P_{fa})}] \quad \text{Equation 9.}$$

In Equation 9, $\alpha$ is a scaling factor called a threshold factor. The threshold factor $\alpha$ can be used to account for a constant offset from other system parameters, such as for correlation among antenna channels of the radar system 104. With an appropriate value of $\alpha$, the CFAR threshold can be output for use in filtering noise from that particular cell of the data cube 118.

In the above example, ambient noise is assumed to follows a Rayleigh distribution. Distribution fitting CFAR can be applied to cases where the noise follows other distributions, besides just the Rayleigh distribution. Where another distribution better models variable noise, such as a normal distribution, distribution fitting CFAR can be used too. The peak of the histogram graph 214 and its mean can be used to find all parameters for the distribution quantile function. For example, the quantile function of the normal distribution is provided by Equation 10:

$$Q(p;\rho,\sigma) = \mu + \sigma\sqrt{2}erf^{-1}(2p-1) \quad \text{Equation 10.}$$

In Equation 10, the mean $\mu$ can be directly calculated from the noise samples, and the standard deviation $\sigma$ can be calculated based on Equation 11.

$$f_{max} = \frac{1}{\sigma\sqrt{2\pi}}. \quad \text{Equation 11}$$

In this way, the CFAR based on Gaussian distribution can be calculated from Equation 12:

$$T_n = \alpha \cdot Q(1 - P_{fa}; \mu, \sigma) \quad \text{Equation 12.}$$

Example Process for Distribution Fitting CFAR Detection

Figure 3:
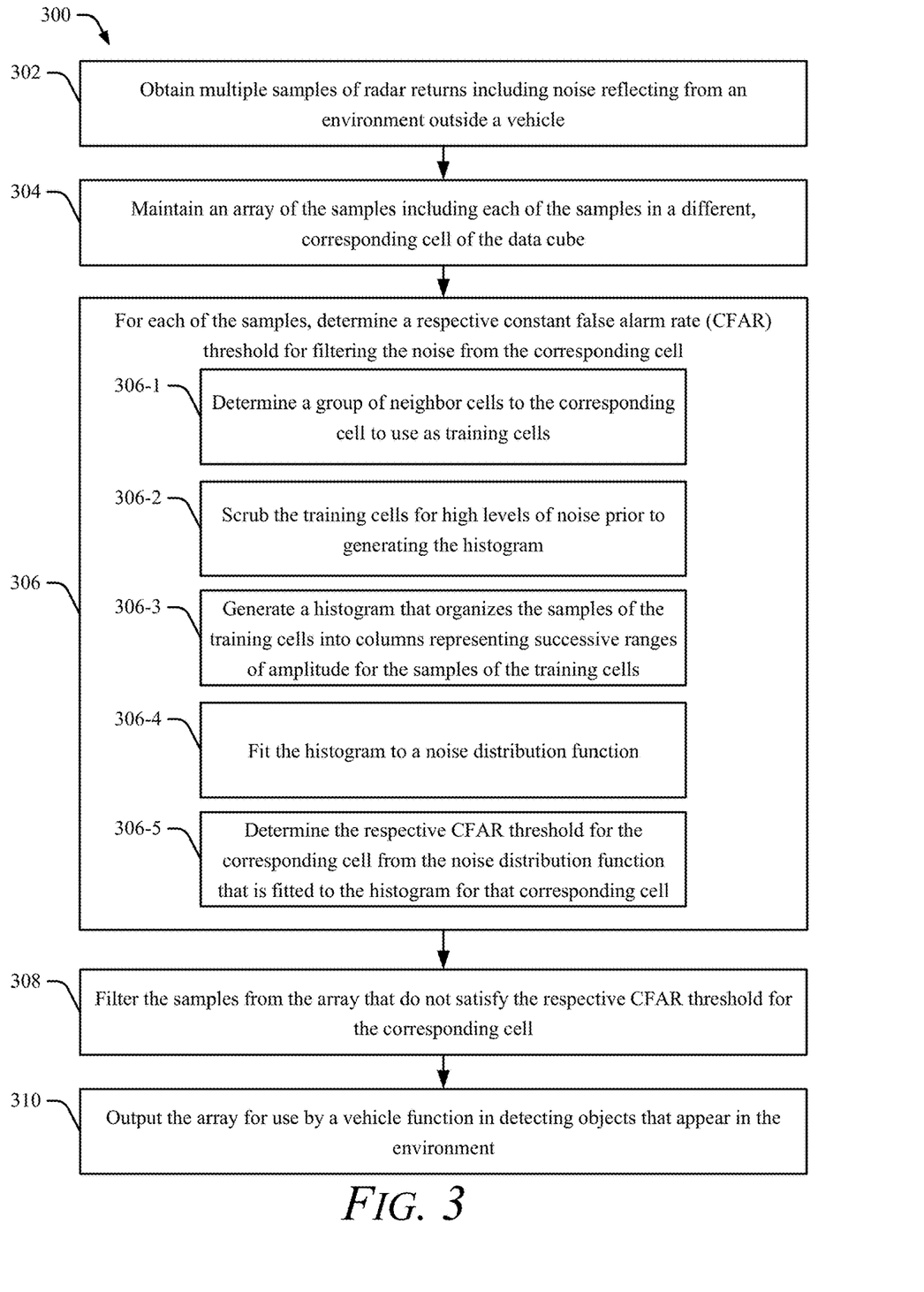
FIG. 3 illustrates a flow diagram of an example process for performing distribution fitting CFAR detection, in accordance with the described techniques.

FIG. 3 illustrates a flow diagram of an example process for performing distribution fitting CFAR detection, in accordance with the described techniques. For ease of description, the process 300 is described primarily in the context of being performed by the radar systems 104 using the processor 114 with access to the CRM 116. For example, the noise estimators 122 and 200 can write to portions of the CRM 116 to write to the data cube 118. The noise estimators 122 and 200 can read from portions of the CRM 116 to read from the data cube 118. Operations (also referred to as steps) of the process 300 are numbered sequentially. However, this numbering does not necessarily imply a specific order of operations. The steps of the process 300 may be rearranged, skipped, repeated, or performed in different ways than the specific way it is shown in the diagram of FIG. 3.

At step 302, multiple samples of radar returns are obtained including noise reflecting from an environment outside a vehicle. For example, the radar system 104 obtains the radar returns 110-2 that reflect off the object 108 and other features in the environment 100. The radar returns 110-2 include noise among actual target detections.

At step 304, an array (e.g., a data cube) of the samples is maintained including each of the samples in a different, corresponding cell of the array. For example, the data cube 118 is written to the CRM 116 by the processor 114.

At step 306, for each of the samples, a respective CFAR threshold for filtering the noise from the corresponding cell of the data cube is determined by executing distribution fitting CFAR techniques (e.g., shown as steps 306-1 to 306-5). For example, the noise estimator 122 or the noise estimator 200 reads each cell of the data cube 118 and applies distribution fitting CFAR techniques at each cell to generate the CFAR threshold for that cell.

At step 306-1, a group of neighbor cells to the corresponding cell is determined to use as training cells. For example, the noise estimator 200 relies on the neighbor selection component 202 analyzes cells located in nearby range, chirp, or channel domains to identify the training cells 210 that contain noise data with similar statistics as a corresponding cell under test $x_{ij}$. The training cells to the corresponding cell may include cells associated with a same chirp as the corresponding cell and associated with a same range or same channel as the corresponding cell. The training cells may be associated with a same channel as the corresponding cell. In other cases, the training cells may be associated with a same range as the corresponding cell.

At step 306-2, the training cells may be scrubbed for high levels of noise prior to the next steps. For example, the data scrub component 204 may enable the noise estimator 200 to reduce the quantity of the training cells 210 identified by the neighbor selection component 202 to remove cells with high levels of noise that are not likely to be representative of actual target.

At step 306-3, a histogram is generated that organizes the samples of the training cells into columns representing successive ranges of amplitude for the samples of the training cells. For instance, the noise estimator 200 uses the histogram builder component 206, which generates the histogram graph 214 of the training cells 212 that remain after scrubbing the training cells 210 originally selected by the neighbor selection component 202. The histogram builder component 206 can organize, based on respective amplitudes of the samples of the training cells 212, the samples of the training cells 212 into the columns representing successive ranges of amplitude. An amplitude of the columns in the histogram graph 214 corresponds to a PDF of the samples of the training cells 212 that are associated with an amplitude range for that column.

At step 306-4, the histogram is fitted to a noise distribution function. For example, the noise distribution function can be a Rayleigh distribution. The noise distribution function can be a normal distribution, or other distribution function. The noise estimator 200 executes the fit-to-model component 208, which fits the histogram graph 214 to the noise model 216 suited for the environment 100.

Noise in the environment 100 often changes. To adapt to the changing noise in the environment 100, the noise model 216 used by the noise estimator 200 may also change from one cell under test to a next cell under test (e.g., different noise models may be used for different cells within the data cube 118). For example, the Rayleigh distribution function may be chosen for fitting noise for a first cell of the data cube 118 and the normal distribution function may be chosen for a second cell of the data cube 118. Said differently, the noise estimator 200 can fit a first histogram for a first cell of the data cube 118 to a first noise distribution function (e.g., normal) and fit a second histogram for a second cell of the data cube 118 to a second noise distribution function (e.g., Rayleigh, other) that is different than the first noise distribution function.

At step 306-5, the respective CFAR threshold for the corresponding cell is determined from the noise distribution function that is fitted to the histogram for that corresponding cell. For example, with the noise model 216 fit to the histogram graph 214, the CFAR threshold for that cell under test can be determined by the noise estimator 200 from correlating a value on a curve defined by the noise model 216 fitted to the cell under test.

At step 308, the samples are filtered from the data cube that do not satisfy the respective CFAR threshold for the corresponding cell. For example, each of the cells of the data cube 118 is filtered by the processor 114 using its respective CFAR threshold to eliminate false detections that appear because of noise in the environment 100, which changes (e.g., unpredictably).

At step 310, responsive to filtering the samples from the data cube, the data cube is output for use by a vehicle function in detecting objects that appear in the environment. For example, the processor 114 outputs an indication of the data cube 118 for enabling other systems of the vehicle 102, or systems external to the vehicle 102, to track objects in the field of view 106 of the radar system 104.

Performance of Distribution Fitting CFAR Detection

Figure 4:
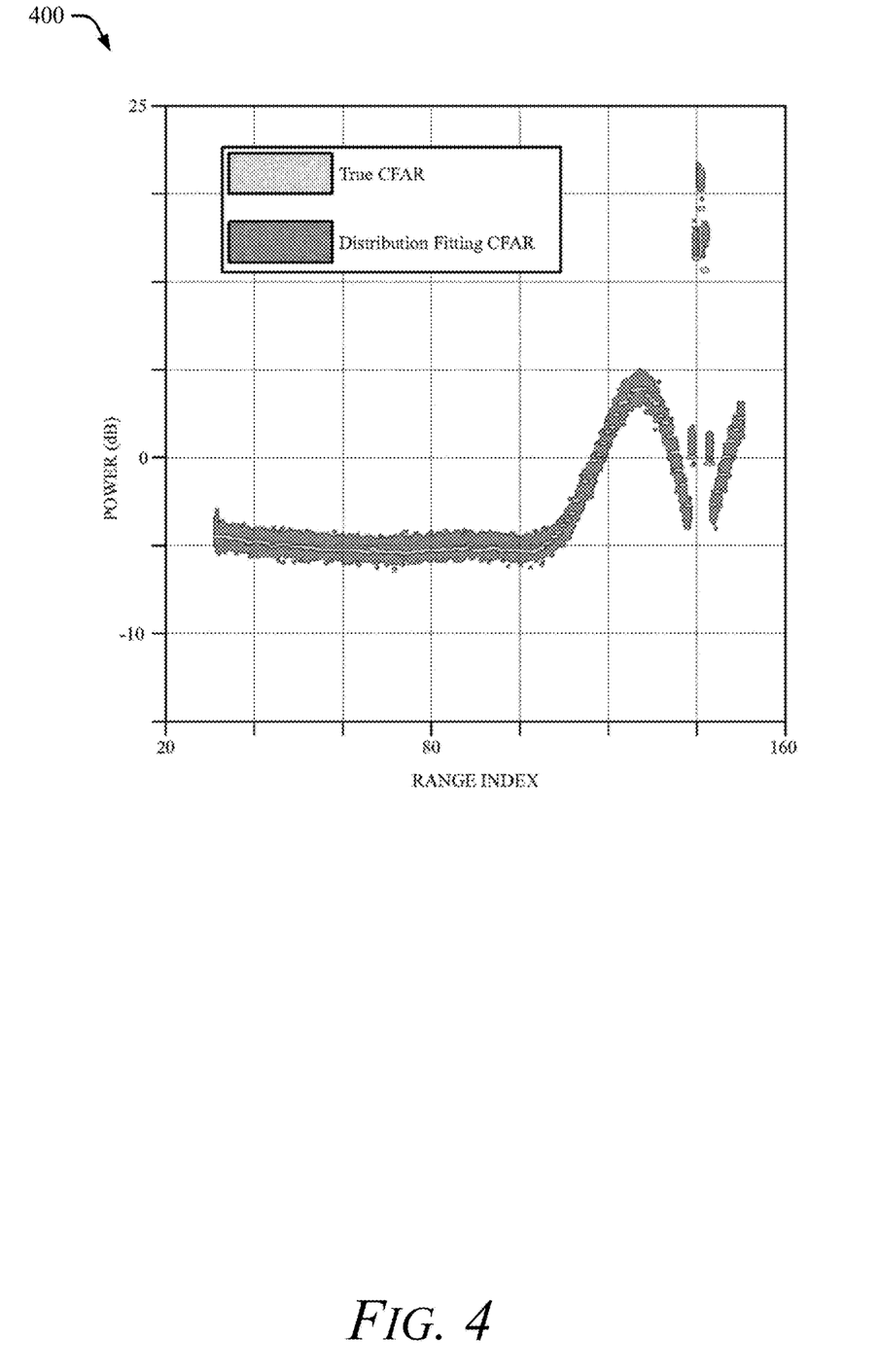
FIG. 4 illustrates a line graph comparing performance of distribution fitting CFAR detection compared to ground truth.

FIG. 4 illustrates a line graph 400 comparing performance of distribution fitting CFAR detection compared to ground truth. The line graph 400 shows results collected from a test chamber in which a single target is located at range bin one hundred forty. Because the power of the return signal is so high, the phase noise creates a hump in the graph 400 between range indices one hundred and one hundred forty. Hundreds of frames are recorded for each range index during the measurement, and each frame contains hundreds of samples. In total, hundreds of thousands of samples are collected in each index, from which an actual CFAR threshold level can be estimated for a given range index. Unlike true CFAR thresholding, distribution fitting CFAR is calculated based on data from a single frame of each range index, which leads to a cloud-like appearance in the graph 400. From the graph 400, it can be observed that a center of the distribution fitting CFAR point cloud is aligned with true CFAR with only a small amount of deviation.

Figure 5:
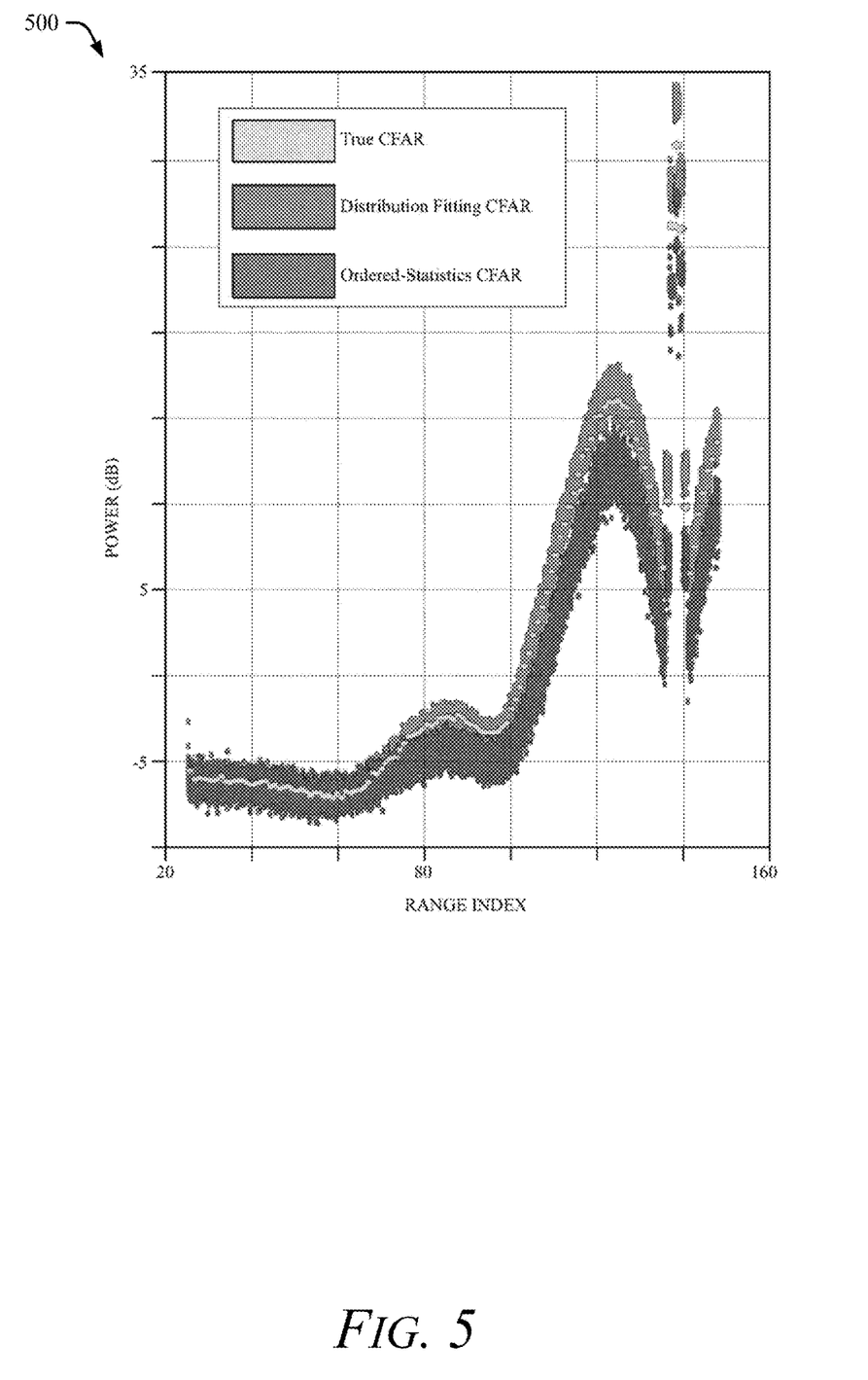
FIG. 5 illustrates a line graph comparing performance of distribution fitting CFAR detection compared to Ordered-Statistics CFAR detection.
Figure 6:
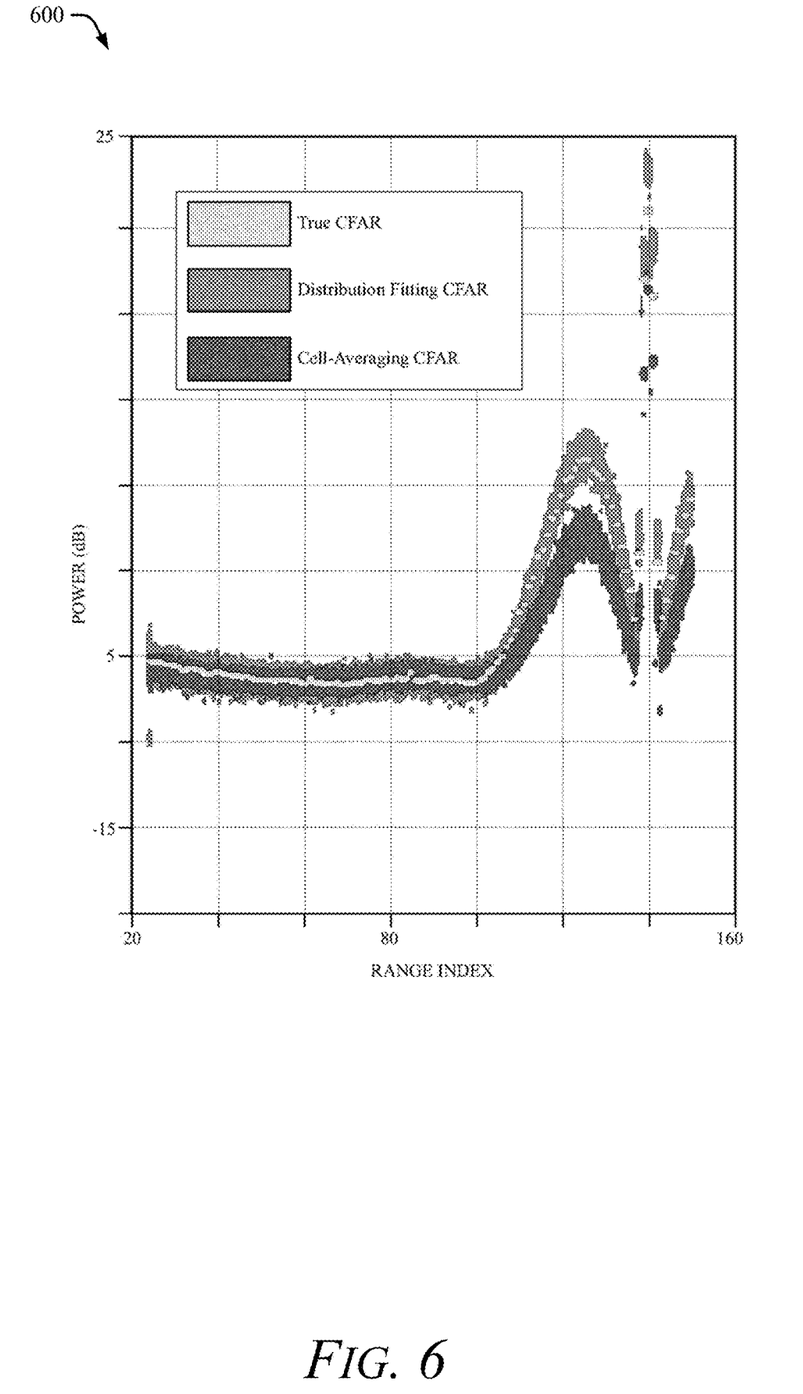
FIG. 6 illustrates a line graph comparing performance of distribution fitting CFAR detection compared to Cell-Averaging CFAR detection.

FIG. 5 illustrates a line graph 500 comparing performance of distribution fitting CFAR detection compared to Ordered-Statistics CFAR detection. FIG. 6 illustrates a line graph 600 comparing performance of distribution fitting CFAR detection compared to Cell-Averaging CFAR detection. Unlike other CFAR algorithms, such as Cell-Averaging CFAR and Ordered-Statistics CFAR, distribution fitting CFAR can provide an accurate CFAR threshold even when a noise distribution changes. As observed from the graphs 500 and 600, in the pure noise region, range indices between forty and sixty, all the CFAR algorithms can provide a good CFAR threshold estimation. When the phase noise becomes more and more dominant in the range bins, the noise distribution changes gradually, and Ordered-Statistics CFAR and Cell-Averaging CFAR no longer provide a correct CFAR threshold estimation. The shifting between the true CFAR and Ordered-Statistics CFAR and Cell-Averaging CFAR indicates that those techniques cannot adapt to environmental variations. In contrast, distribution fitting CFAR can maintain a good CFAR threshold estimation because noise samples are analyzed and fit it into a proper distribution model for that unit cell or bin under test. This process ensures that an accurate CFAR threshold estimation can be determined even if the noise distribution is changed.

Further Examples

Some further examples in view of the techniques described above include:

Example 1: A method, comprising: obtaining, by a processor of a system, multiple samples of radar returns including noise reflecting from an environment outside a vehicle; maintaining, by the processor, an array of the samples including each of the samples in a different, corresponding cell of the array; for each of the samples, determining, by the processor, a respective constant false alarm rate (CFAR) threshold for filtering the noise from the corresponding cell of the array by: determining a group of neighbor cells to the corresponding cell to use as training cells; generating a histogram that organizes the samples of the training cells into columns representing successive ranges of amplitude for the samples of the training cells; fitting the histogram to a noise distribution function; and determining the respective CFAR threshold for the corresponding cell from the noise distribution function that is fitted to the histogram for that corresponding cell; and filtering, by the processor, the samples from the array that do not satisfy the respective CFAR threshold for the corresponding cell; and responsive to filtering the samples from the array, outputting, by the processor, the array for use by a vehicle function in detecting objects that appear in the environment.

Example 2: The method of example 1, wherein determining the respective CFAR threshold for filtering the noise from the corresponding cell of the array comprises scrubbing the training cells for high levels of noise prior to generating the histogram.

Example 3: The method of any example above, wherein the training cells to the corresponding cell comprise cells associated with a same chirp as the corresponding cell and associated with a same range or same channel as the corresponding cell.

Example 4: The method of any example above, wherein the training cells to the corresponding cell comprise cells associated with a same channel as the corresponding cell.

Example 5: The method of any example above, wherein the training cells to the corresponding cell comprise cells associated with a same range as the corresponding cell.

Example 6: The method of any example above, wherein generating the histogram comprises: organizing, based on respective amplitudes of the samples of the training cells, the samples of the training cells into the columns representing successive ranges of amplitude, an amplitude of the columns corresponding to a probability density function of the samples of the training cells that are associated with an amplitude range for that column.

Example 7: The method of any example above, wherein the noise distribution function comprises a Rayleigh distribution.

Example 8: The method of any example above, wherein the noise distribution function comprises a normal distribution.

Example 9: The method of any example above, wherein fitting the histogram to the noise distribution function comprises: fitting a first histogram for a first cell to a first noise distribution function; and fitting a second histogram for a second cell to a second noise distribution function that is different than the first noise distribution function.

Example 10: The method of any example above, wherein the array comprises a data cube.

Example 11: A system comprising means for performing the method of any example above.

Example 12: A system comprising a processor configured to perform the method of any example above.

Example 13: A computer readable media including instructions that, when executed, cause a processor to perform the method of any example above.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with CFAR threshold setting can occur in other systems (e.g., lidar systems) that process sensor point cloud detections in noisy environments, including driving situations. Therefore, although described to improve radar detecting, the techniques of the foregoing description can be adapted and applied to other problems to effectively detect objects in a scene using other types of sensors.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

I claim:

1. A system comprising:
a first processor configured to:
obtain multiple samples of radar returns including noise reflecting from an environment outside a vehicle;
maintain an array of the samples including each of the samples in a different, corresponding cell of the array;
for each of the samples, determine a respective constant false alarm rate (CFAR) threshold for filtering the noise from the corresponding cell of the array by:
determining a group of neighbor cells to the corresponding cell to use as training cells;

generating a histogram that organizes the samples of the training cells into columns representing successive ranges of amplitude for the samples of the training cells;
fitting the histogram to a noise distribution function; and
determining the respective CFAR threshold for the corresponding cell from the noise distribution function that is fitted to the histogram for that corresponding cell; and
filter the samples from the array that do not satisfy the respective CFAR threshold for the corresponding cell; and
responsive to filtering the samples from the array, output the array for use by a vehicle function in detecting objects that appear in the environment; and
a second one or more processors configured to control driving of the vehicle based on avoiding an object detected based on the output array.

2. The system of claim 1, wherein the first processor is configured to determine the respective CFAR threshold for filtering the noise from the corresponding cell of the array by scrubbing the training cells for high levels of noise prior to generating the histogram.

3. The system of claim 1, wherein the training cells to the corresponding cell comprise cells associated with a same chirp as the corresponding cell and associated with a same range or same channel as the corresponding cell.

4. The system of claim 1, wherein the training cells to the corresponding cell comprise cells associated with a same channel as the corresponding cell.

5. The system of claim 1, wherein the training cells to the corresponding cell comprise cells associated with a same range as the corresponding cell.

6. The system of claim 1, wherein the first processor is configured to generate the histogram by:
organizing, based on respective amplitudes of the samples of the training cells, the samples of the training cells into the columns representing successive ranges of amplitude,
an amplitude of the columns corresponding to a probability density function of the samples of the training cells that are associated with an amplitude range for that column.

7. The system of claim 1, wherein the noise distribution function comprises a Rayleigh distribution.

8. The system of claim 1, wherein the noise distribution function comprises a normal distribution.

9. The system of claim 1, wherein the first processor is further configured to fit the histogram to the noise distribution function by:
fitting a first histogram for a first cell to a first noise distribution function; and
fitting a second histogram for a second cell to a second noise distribution function that is different than the first noise distribution function.

10. The system of claim 1, wherein the system comprises a radar system of the vehicle, and the array comprises a data cube.

11. A method, comprising:
obtaining, by a first processor of a system, multiple samples of radar returns including noise reflecting from an environment outside a vehicle;
maintaining, by the first processor, a data cube of the samples including each of the samples in a different, corresponding cell of the data cube;
for each of the samples, determining, by the first processor, a respective constant false alarm rate (CFAR) threshold for filtering the noise from the corresponding cell of the data cube by:
determining a group of neighbor cells to the corresponding cell to use as training cells;
generating a histogram that organizes the samples of the training cells into columns representing successive ranges of amplitude for the samples of the training cells;
fitting the histogram to a noise distribution function; and
determining the respective CFAR threshold for the corresponding cell from the noise distribution function that is fitted to the histogram for that corresponding cell; and
filtering, by the first processor, the samples from the data cube that do not satisfy the respective CFAR threshold for the corresponding cell; and
responsive to filtering the samples from the data cube, outputting, by the first processor, the data cube for use by a vehicle function in detecting objects that appear in the environment; and
by a second one or more processors, controlling driving of the vehicle based on avoiding an object detected based on the output data cube.

12. The method of claim 11, wherein determining the respective CFAR threshold for filtering the noise from the corresponding cell of the data cube comprises scrubbing the training cells for high levels of noise prior to generating the histogram.

13. The method of claim 11, wherein the training cells to the corresponding cell comprise cells associated with a same chirp as the corresponding cell and associated with a same range or same channel as the corresponding cell.

14. The method of claim 11, wherein the training cells to the corresponding cell comprise cells associated with a same channel as the corresponding cell.

15. The method of claim 11, wherein the training cells to the corresponding cell comprise cells associated with a same range as the corresponding cell.

16. The method of claim 11, wherein generating the histogram comprises:
organizing, based on respective amplitudes of the samples of the training cells, the samples of the training cells into the columns representing successive ranges of amplitude,
an amplitude of the columns corresponding to a probability density function of the samples of the training cells that are associated with an amplitude range for that column.

17. The method of claim 11, wherein the noise distribution function comprises a Rayleigh distribution.

18. The method of claim 11, wherein the noise distribution function comprises a normal distribution.

19. The method of claim 11, wherein fitting the histogram to the noise distribution function comprises:
fitting a first histogram for a first cell to a first noise distribution function; and
fitting a second histogram for a second cell to a second noise distribution function that is different than the first noise distribution function.

20. Non-transitory computer-readable media having instructions stored thereon that, when executed, cause one or more processors to:
obtain multiple samples of radar returns including noise reflecting from an environment outside a vehicle;

maintain a data cube of the samples including each of the samples in a different, corresponding cell of the data cube;

for each of the samples, determine a respective constant false alarm rate (CFAR) threshold for filtering the noise from the corresponding cell of the data cube by:
  determining a group of neighbor cells to the corresponding cell to use as training cells;
  generating a histogram that organizes the samples of the training cells into columns representing successive ranges of amplitude for the samples of the training cells;
  fitting the histogram to a noise distribution function; and
  determining the respective CFAR threshold for the corresponding cell from the noise distribution function that is fitted to the histogram for that corresponding cell; and filtering the samples from the data cube that do not satisfy the respective CFAR threshold for the corresponding cell;

responsive to filtering the samples from the data cube, outputting the data cube for use by a vehicle function in detecting objects that appear in the environment; and control driving of the vehicle based on avoiding an object detected based on the output data cube.

* * * * *